United States Patent [19]

Sheridan

[11] 4,130,300
[45] Dec. 19, 1978

[54] COMPOSITE ABRASION RESISTANT PIPE ELBOW

[76] Inventor: Joseph U. Sheridan, 400 Chadwick Dr., Havelock, N.C. 28532

[21] Appl. No.: 875,738

[22] Filed: Feb. 6, 1978

[51] Int. Cl.² .............................................. F16L 55/00
[52] U.S. Cl. ...................................... 285/16; 285/179
[58] Field of Search ...................... 285/15, 16, 17, 45, 285/179, 55; 302/64; 138/92

[56] References Cited

U.S. PATENT DOCUMENTS

| 584,968 | 6/1897 | Taylor | 285/16 |
| 1,246,189 | 11/1917 | Vanderlip | 285/16 |
| 1,314,699 | 9/1919 | Poppenhagen | 285/174 X |
| 3,403,703 | 10/1968 | Reinmann | 138/92 |

Primary Examiner—Dave W. Arola
Attorney, Agent, or Firm—B. B. Olive

[57] ABSTRACT

A composite pipe elbow adapted to resist abrasive wear wherein the outside bend portion most subject to abrasive attack is comprised of a plurality of ceramic wear blocks with the remaining portion of the elbow being composed of steel and preferably a heat-treated steel having an inner surface hardness of at least 500 Brinell.

7 Claims, 8 Drawing Figures

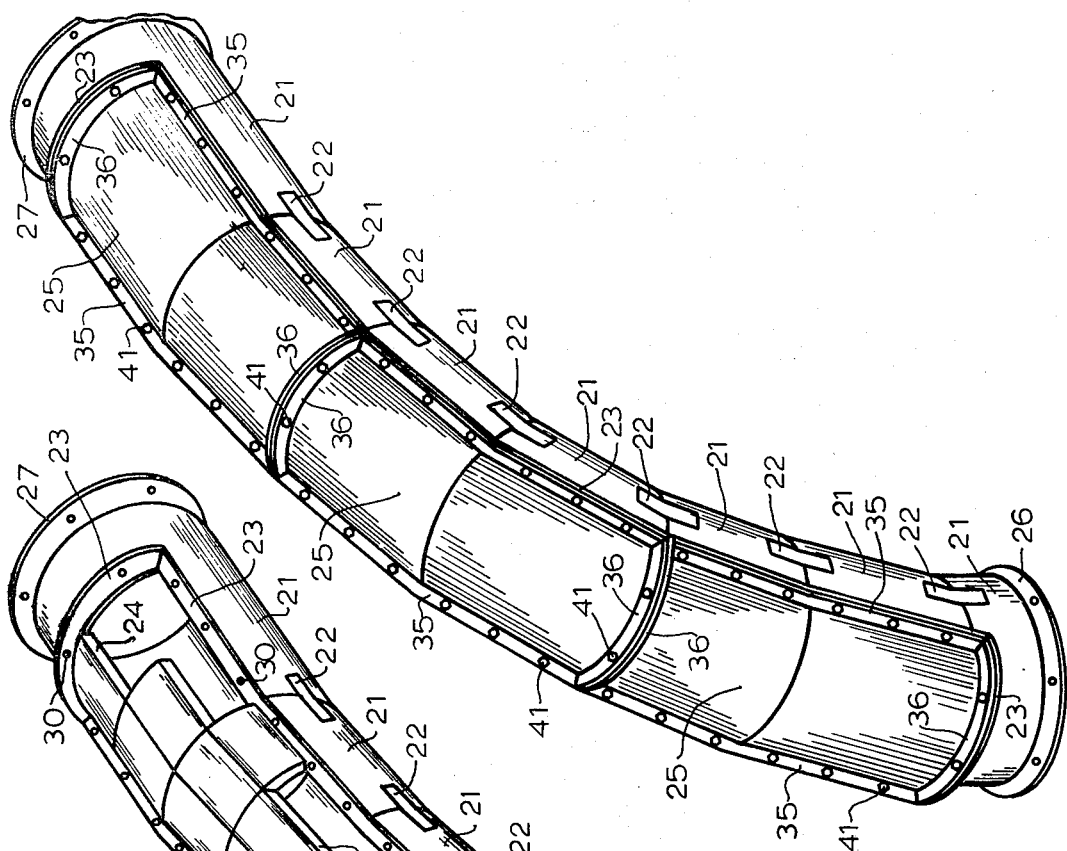
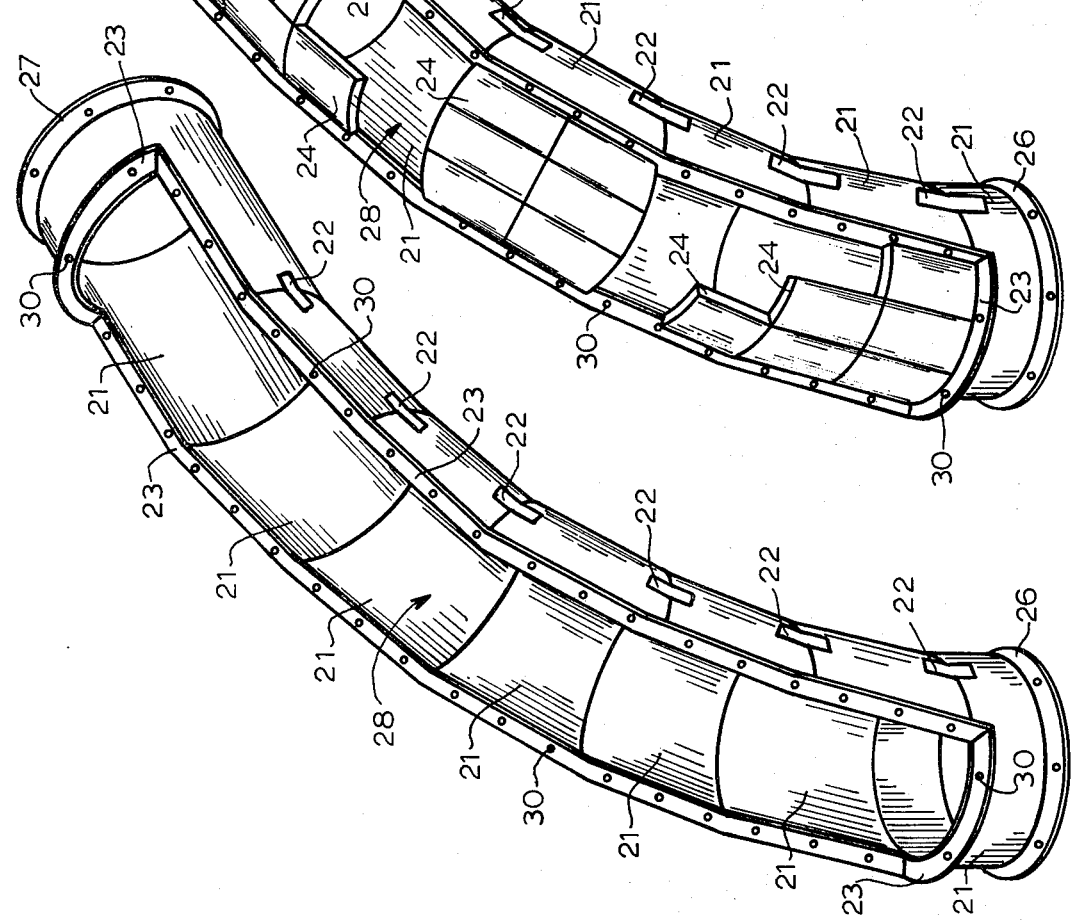

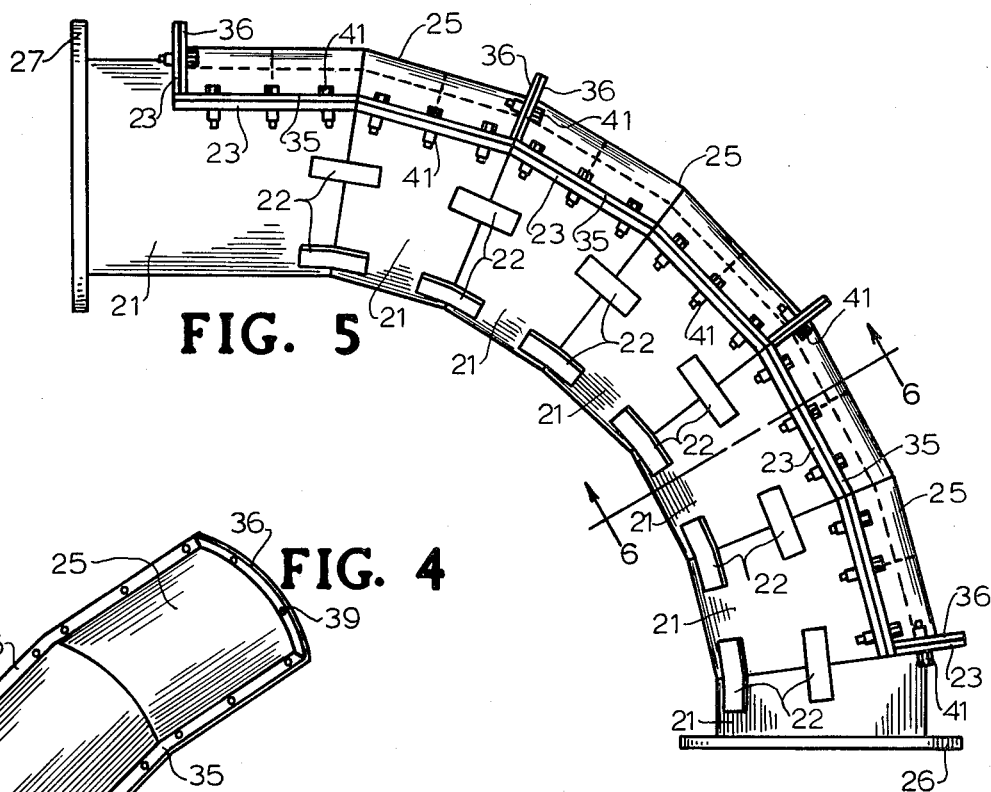
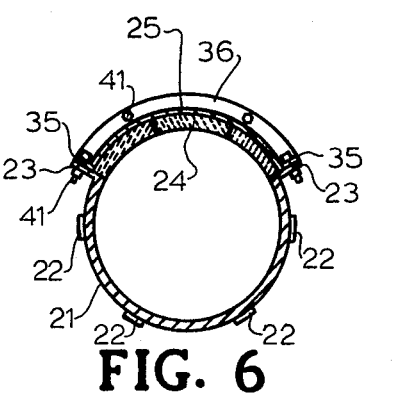
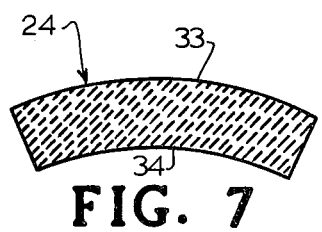
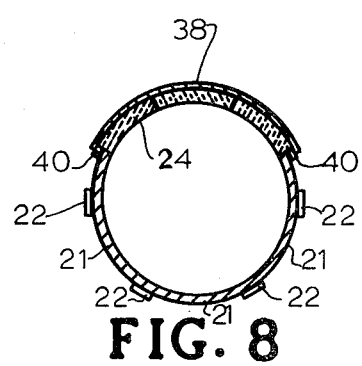

COMPOSITE ABRASION RESISTANT PIPE ELBOW

BACKGROUND OF THE INVENTION

1. Field of the Invention

The invention relates generally to tubular pipe fittings and more particularly to a pipe elbow construction which provides a high resistance to abrasive wear when carrying abrasive fluids.

2. Description of the Prior Art

Before coal can be burned in power generating boilers, it must first be pulverized and then pneumatically moved from the pulverizer to the combustion chamber of a boiler. The coal requirements in modern generating units are enormous and often exceed 500 tons per hour for a single boiler. The need to move such large volumes of a highly abrasive material places great demands on the piping system through which it is conveyed. As one might expect, excessive wear is a common occurrence throughout the system with the problem being especially severe in the pipe elbows which change the direction of flow.

As is known, upon a change in the direction of flow of a fluent containing abrasive particles, the wall facing the oncoming stream is subjected to a continuous bombardment of such particles. The result is that the outer bends of the pipe elbows in these coal transport systems are rapidly worn down and the fittings must be patched or replaced at frequent intervals. The down time and other costs accrued in the need to continually make such repairs represents a substantial economic loss.

In previous attempts to resolve this problem, a variety of approaches have been taken but a wholly satisfactory solution has not resulted from these efforts.

As illustrated in U.S. Pat. Nos. 1,246,189 and 3,551,006, one approach has been to provide the elbow with an abrasion-resistant lining.

In U.S. Pat. No. 1,211,784, an elbow construction is described which consists of two separate semicylindrical sections with the medial portion of one section being enlarged to accommodate a recess into which lining blocks are inserted.

Another approach is illustrated in U.S. Pat. No. 3,977,730 where an impact plate is fixed to the outside surface of the outer bend of the elbow.

In U.S. Pat. No. 3,794,359 a pipe elbow fabricated entirely from non-metallic materials is described. The elbow consists of a pair of wear plates of ceramic material having a semi-circular shape and assembled circumferentially in opposing spaced relationship to each other. A resinous grout is disposed in the circumferential space between the opposed wear plates and a fiberglass reinforced resin provides a cover over the wear plates and grout.

With the foregoing in mind, the object of the present invention is to provide a wear resistant elbow fitting which offers advantages not heretofore afforded by any known prior art constructions.

SUMMARY OF THE INVENTION

The angled elbow structure of the present invention is formed from pipe sections initially cut from a length of straight steel pipe. The pipe sections are provided with square ends which are butted tightly together and tack welded. The permanent joint is made by welding at least four longitudinal mild steel straps across the joint in equal spacing around the pipe. The straps are welded to the pipe with a single pass fillet weld on each side and around the ends. After the straps are welded, the joint is seal welded with a single stringer bead between the straps. Forces tending to open the joint, or bend the pipe, are carried by the straps in tension and their welds in shear.

Each of the pipe sections has an arcuate segment removed from the outer portion thereof to provide a rectangular opening which extends throughout the length of the outer bend of the elbow. The aforesaid rectangular opening is rimmed by an open frame structure which is mounted on the pipe edges surrounding the opening.

The back or outside curvature of the elbow which is subjected to the greatest abrasive action from the flowing fluid is formed by positioning wear blocks across the rectangular opening in a keystone arrangement which follows the contour of the fitting and thrusts against the aforementioned frame member. The blocks are appropriately shaped for proper fitting and are formed from a very hard, highly densified ceramic material. The wear blocks are held rigidly in place by a cover plate which fits over them. The cover plate may be provided with a flange to be used for securing it to the mentioned frame by bolts or clamps, or alternatively the ends of the plate may be welded to a bar member which in turn is welded onto the pipe sections of the elbow.

In a preferred embodiment, the metal portion of the tubular fitting is comprised of a high carbon, heat-treated steel having an inner surface hardness of at least 500 Brinell and the non-metallic wear blocks are fabricated ceramic.

DESCRIPTION OF THE DRAWINGS

FIG. 1 is a perspective view of a partially assembled pipe elbow illustrating the rectangular opening with the open frame member in place.

FIG. 2 is a perspective view of the elbow fitting in a further stage of assembly where positioning of the wear blocks across the rectangular opening in a keystone arrangement is illustrated.

FIG. 3 is a perspective view of a fully assembled pipe elbow with a flanged cover plate in place.

FIG. 4 is a perspective view of one section of the flanged cover plate.

FIG. 5 is a view of the fully assembled elbow fitting in side elevation.

FIG. 6 is a section view taken along line 6—6 of FIG. 5.

FIG. 7 is an enlarged end view of a wear block showing its shape and curvature.

FIG. 8 is a cross sectional view of the fully assembled pipe elbow illustrating a cover plate which is welded in place.

DETAILED DESCRIPTION OF THE INVENTION

From the drawings, it is seen that the pipe elbow construction of this invention consists of a plurality of pipe sections or segments 21 which are butt joined in an elbow configuration and held together by welded flat bars or straps 22 positioned across the joints; and open frame structure 23; a plurality of wear blocks 24 from which the back wall of the elbow is formed; and a cover plate 25 which fits over and rigidly holds the wear blocks in place. The elbow is further provided with the usual pipe connecting flanges 26 and 27 or other commercially available couplings.

One of the advantages of the invention is that the various metal sections from which the elbow is formed can be cut from a straight length of steel piping. Generally speaking, the pipe diameter will be in the range of from 16 to 24 inches with a wall thickness of from about ⅜ to ½ inch. Also, the piping used is desirably constituted of hardened steel, and especially preferred is pipe formed from a high carbon, low alloy steel which has been heat treated to provide an inner pipe surface having a Brinell hardness of at least 500 with the outer core being softer, less brittle and more amenable to welding procedures. Such type piping is commercially available and presently marketed by Xtek, Inc., of Cincinnati, Ohio.

The segmented pipe elements may be of any desired angle with 15° being generally adequate and probably most economical. Once the pipe segments have been cut to the selected angle, the end surfaces are machined or otherwise finished to provide good mating contact so that no gap will exist to cause flow turbulence when the elbow is in service.

The segments are joined by butting the square ends tightly together and mild steel straps (generally designated by the numeral 22 in the drawings) are welded onto the segments across the joints with a single pass fillet weld on each side and around the ends. After the straps are welded, the joint is seal welded with a flat weld between the straps. The forces tending to open the joint, or bend the pipe, are carried by these straps in tension and their welds in shear. At least four straps should be employed for each joint and they should be equally spaced around the circumference of the pipe. Desirably, the straps are at least 8 inches long with a width of about 1½ inches and a thickness of about ¼ inch.

When the pipe segments are composed of the aforementioned high carbon, heat-treated steel, a special welding procedure should be used. That is, the outside surface of the segments should be preheated to a temperature of at least 350° F. with this temperature being maintained during the welding operation. Thereafter, the heated surface is slowly cooled to ambient temperatures. Slow cooling can be assured by wrapping with several layers of asbestos paper, or by other effective insulation. Utilization of this technique provides a strong joint without softening the inner hardened surface of the pipe.

The elbow formed from the pipe sections is provided with an arcuate rectangular opening in the back portion thereof which extends through the full length of the outside bend, but may, if desired, extend into the tangent sections as well. Preferably, the opening is formed by cutting out the appropriate segment from each of the pipe sections with appropriate precision and prior to assembly into the elbow structure, although the opening could be formed in one cutting operation after the elbow has been assembled.

The rectangular opening referred to above is best illustrated in FIG. 1 of the drawings where it is designated by the numeral 28. As shown, the open steel frame or flange 23 circumscribes or rims opening 28. The frame 23 is attached to the pipe edges upon which it is mounted by a light fillet weld. Appropriate bolt-receiving holes 30 are provided throughout the frame member.

Attention is now directed to FIG. 2 of the drawings where the formation of the impact wall of the pipe fitting is illustrated. As seen, wear blocks 24 are positioned across rectangular opening 28 and are wedged together in a keystone configuration which follows the contour of the opposing pipe wall and thrusts against frame member 23. Although not required, the blocks may be cemented together with any suitable material to effect an airtight structure. Once positioned, the blocks or tiles are held rigidly in place by metal cover plates 25. (See FIGS. 3, 5, and 6)

As shown in the end view of FIG. 7, the top surface 33 and bottom surface 34 of the wear blocks are appropriately curved for forming a keystone-like arrangement. In addition, the edges are mitered to form tight fitting joints between adjacent blocks. Although the optimum block thickness will vary depending upon the pipe diameter in which they are to be used, a satisfactory thickness will generally be in the range of from about 1 to 1½ inches.

The blocks or tiles are composed of a ceramic material processed at elevated temperatures and are fabricated to the desired shape and size by means of a press mold or by other known techniques. Although ceramics, in general, are characterized by an extremely high resistance to abrasion far exceeding that of steel, a substantially pure, high density alumina ceramic is a superbly suitable material for use in the fabrication of these wear tiles. Such a material is marketed by A. P. Green Refractories Company of Mexico, Missouri.

The metal cover plates 25 used to hold the wear tiles 24 rigidly in place may be fabricated in sections with each section being provided with flanges for securement to the elbow structure by means of bolts 41 or clamps. Such design is illustrated in FIGS. 3, 4, 5, and 6. As seen in FIG. 4, each cover section is provided with a pair of opposing longitudinal flanges 35 and a pair of transverse flanges 36 with bolt holes 39 being present in each flange member. The attachment of the cover plate sections 25 to the elbow structure is best illustrated in FIG. 5. As shown, the sections are detachably fixed to frame member 23 and to each other by bolts 41.

Although the aforementioned means of attachment permits removal of the cover plate member for inspection of the wear tiles or replacement of one or more tiles if worn, this is not likely to be necessary and there is no requirement that the cover plate be detachable. Therefore, the cover may be fixedly secured to the elbow structure. In this embodiment, the frame or rim member 23 is replaced by a bar 40 which surrounds and is welded in place around the arcuate opening after which cover plate 38 is welded to bar 40 as indicated in FIG. 8 so as to cover and retain wear tiles 24.

The invention thus provides a composite pipe elbow fitting which can withstand the impact of fluidized coal particles moving at high velocities because materials having an extraordinary resistance to abrasion form an integral part of the elbow construction and are located in the area most subject to abrasive attack.

Various modes of carrying out the principles of the invention are contemplated as being within the scope of the following claims.

What is claimed is:
1. A composite pipe elbow adapted to resist abrasive wear which comprises:
(a) a segmented elbow construction formed from a plurality of pipe sections initially cut from a straight steel pipe and wherein said elbow construction has an arcuate segment removed from the outer curved portion thereof to provide an arcuate, rectangular opening which extends through the length of said outer curved portion;

(b) an open frame member mounted on the edges of said opening and forming a rim about said opening;

(c) a plurality of shaped, ceramic wear blocks positioned across and filling said rectangular opening in a keystone configuration thrusting against said frame member and forming therewith an inner impact wall in the curved portion of said composite pipe elbow; and (d) a cover plate positioned over said wear blocks and secured to said pipe elbow.

2. A composite elbow according to claim 1 wherein the pipe sections from which said segmented elbow construction is formed have an angle of about 15° and wherein said sections are butt joined and welded at the joints and further secured by longitudinal mild steel straps which are welded across the joints.

3. A composite pipe elbow according to claim 1 wherein said pipe sections are comprised of a high carbon, heat-treated steel and wherein the inside surface of said pipe sections have a Brinell hardness of at least 500.

4. A composite pipe elbow according to claim 1 wherein said ceramic is alumina.

5. A composite pipe elbow according to claim 1 wherein said cover plate consists of a plurality of flanged sections detachably secured to each other and to said frame member.

6. A composite pipe elbow according to claim 1 wherein said cover plate is welded in position on said composite elbow.

7. A composite pipe elbow adapted to resist abrasive wear which comprises:

(a) a segmented elbow construction formed from a plurality of pipe sections initially cut from a straight steel pipe which is composed of a high carbon, heat treated steel and has a hardness of at least 500 Brinell on the inside surface thereof, and wherein said elbow construction has an arcuate segment removed from the outer curved portion thereof to provide a rectangular opening which extends through the length of said outer curved portion;

(b) an open frame member mounted on the edges of said opening and forming a rim about said opening;

(c) a plurality of shaped alumina wear blocks positioned across said opening in a keystone configuration thrusting against said frame member and forming therewith an inner impact wall in the outer curved portion of said composite elbow; and (d) a cover plate positioned over said wear blocks and secured to said pipe elbow.

* * * * *